United States Patent Office 3,589,987
Patented June 29, 1971

---

3,589,987
METHOD FOR THE ELECTROLYTIC PREPARATION OF TUNGSTEN CARBIDE
John M. Gomes, Don H. Baker, Jr., and Kenji Uchida, Reno, Nev., assignors to the United States of America as represented by the Secretary of the Interior
No Drawing. Filed May 6, 1969, Ser. No. 822,323
Int. Cl. B01k 1/00
U.S. Cl. 204—61                  10 Claims

ABSTRACT OF THE DISCLOSURE

Tungsten monocarbide is synthesized by electrolysis from a molten bath of alkali metal tungstate, alkali metal halide, alkali hydroxide and a compound of boron in the form of $B_2O_3$, alkali metaborate ($M_2B_2O_4$) or alkali tetraborate ($M_2B_4O_7$). The cell anode is the carbon source.

---

The present invention relates to the preparation of tungsten monocarbide.

Over 45% of the tungsten consumed in the United States is as tungsten monocarbide (WC) which is the most important constituent of modern cemented hard materials. The current industrial method for producing this compound consists of ore decomposition, preparation and purification of intermediate products, reduction to high purity metal, and carburization of the metal of carbide.

There have also been some research efforts to prepare the carbide by molten salt electrolysis. A summary of this work is reported in "Refractory Hard Metals" by Schwartzkopf and Kieffer, Macmillan Publishing Company, 1953.

We have now developed a novel and improved method for producing tungsten carbide by molten salt electrolysis. Basically, the process comprises employing as the molten electrolyte a mixture containing alkali tungstate, alkali halide, alkali hydroxide, and an oxide of boron in the form of $B_2O_3$, alkali metaborate or alkali tetraborate. Those alkali salts suitable for practice of the present invention are the salts of sodium, potassium and lithium. The source of carbon is a carbon (e.g., graphite) anode. With regard to the electroylte composition, alkali tungstate is the tungsten source material; alkali halide functions as solvent and provides a highly electrically conductive medium; alkali hydroxide is added to increase the alkalinity of the system, as tungsten metal is deposited from acidic or neutral melts; boron oxides are added to control compound deposition—at a mole ratio of about 1:1 of boron oxide ($B_2O_3$ basis) to alkali tungstate, WC is deposited; as the ratio decreases less carbide is deposited until at a ratio of 1:8, no carbide is deposited; at a mole ratio of about 1.5:1, $W_2C$ and tungsten metal are deposited; at a mole ratio of 2:1 or more, tungsten borides are deposited. When boron oxide is absent from the melt, deposits are not formed. The carbide deposits obtained by the practice of the present invention are botyroidal masses composed of coarse crystalline aggregates as opposed to a powdery deposit heretofore obtained by electrolysis. Further, the product is easily scraped off the hot cathode and cleaned of adhering electrolyte by solvent extraction.

It is therefore an object of the present invention to produce coarse crystalline tungsten monocarbide by molten salt electrolysis. Another object is to produce the carbide from an alkali tungstate source. A further object is to control the type of tungsten monocarbide deposition. A still further object is to produce tungsten monocarbide while employing the anode as the carbon source. Other objects will be obvious from the following more detailed description of the invention.

In the practice of the invention a molten bath having the desired ingredients is first established in a cell which has a carbon (e.g., graphite) anode. The cathode can be carbon (e.g., graphite) or tungsten. With regard to the bath composition, the ingredients are preferably present in the following relative quantities: 1 mole of alkali tungstate per about 14 to 22 moles of alkali halide per about 1.0 to 2.0 moles of alkali hydroxide per about 0.8 to 1.2 moles of oxide of boron (on a $B_2O_3$ basis). The halide halt is preferably a chloride or a mixture of chloride and fluoride. Anhydrous technical grade salts of all the ingredients can be employed.

Scheelite or wolframite or concentrates can be the tungsten source material. Initially treating such concentrates for removal of calcium, iron or manganese oxide by high temperature solvent extraction techniques results in a more efficient electrolysis. Such an extraction is described in U.S. Pat. 3,373,097, issued Mar. 12, 1968, entitled "Methods of Separating Metals from Gangue Constituents," by Gomes et al. The tungsten containing phase of such a solvent extraction consists of sodium tungstate and halide salts, which are the major constituents of the electrolyte of the present invention.

The molten bath is preferably at a temperature of about 1000° C. to about 1050° C. At temperatures above 1050° C., electrolyte begins to volatilize at a rapid rate, while at temperatures below 1000° C. (i.e., about 850°–950° C.) the cathode deposit contains excessive carbon, although the major deposit is still tungsten monocarbide. Heat can be supplied, for example, by an electrcal furnace wth silicon carbide elements. A protective atmosphere is not necessary.

Once the molten bath is established the following operating conditions are preferably employed: an initial cathode current density of 10 to 150 amp./dm.$^2$ (at higher current densities tungsten dicarbide is co-deposited); an anode current density of 3 to 5 amp./dm.$^2$.

The following two examples illustrate particular manners of carrying out our invention.

EXAMPLE 1
Electrolyte

| Component | Weight percent |
|---|---|
| Moles: | |
| 1.0 ..... $Na_2WO_4$ ..... | 18.8 |
| 14.0 ..... NaCl | 52.7 |
| 7.0 ..... NaF ......... | 18.8 |
| 2.0 ..... NaOH | 5.2 |
| 1.0 ..... $B_2O_3$ ......... | 4.5 |

A 1,000-gram charge of all the above components, except NaOH, was added to an electrolytic cell having a graphite anode and heated to 1,000° C. The sodium hydroxide was added slowly to the melt to avoid electrolyte boil-over, as excessive frothing results from the reaction. After the completion of the NaOH addition and temperature stabilization at 1,000° C., a tungsten cathode was submerged in the electrolyte and electrolysis was initiated. The operating current was 100 amperes at 2.5 to 3.0 volts; the initial cathode current density about 150 a./dm.$^2$. After the passage of 100 ampere-hours of current (1 hour), the cathode was withdrawn from the cell and the deposited tungsten carbide was scraped from the hot electrode.

To replace the drag-out of adhering electrolyte, sodium tungstate and other electrolyte constituents were added to the cell and the electroylsis cycle was repeated. Ten cycles were employed.

The cooled deposits were cleaned of adhering electrolyte in a 5 weight-percent HCl solution, followed by additional cleaning in a 2 weight-percent NaOH solution. The carbide was then washed by water decantation, dried, and weighed. The following results were obtained:

Table 1

Percentage of tungsten in $Na_2WO_4$ recovered as WC (percent) _____ 85
Grams of WC per ampere-hour _____ 0.52
Analysis of WC (element):
    W _____weight percent__ 92.8
    C _____do____ 6.2
    Al _____p.p.m__ <5
    B _____p.p.m__ 25
    Ca _____p.p.m__ <15
    Cu _____p.p.m__ 25
    Fe _____p.p.m__ 50
    Mn _____p.p.m__ 25
    Ni _____p.p.m__ 10
    Si _____p.p.m__ <15

The WC had a hexagonal structure and a specific gravity of $15.9 \pm 0.7$ gm./cm.$^3$. The crystalline aggregates were 85 weight percent plus 60-mesh. The aggregates were friable and easily reduced in size by grinding.

EXAMPLE 2

A wolframite concentrate analyzing 67.7% $WO_3$, 20.6% MnO, and 9.0% FeO was the tungsten source material. The charge for a high temperature solvent extraction was 300 grams wolframite, 470 grams NaCl, and 183 grams $Na_2SiO_3$. The mixture was held at 1,070° C. for 1 hour, which was sufficient time for phases to form and obtain equilibrium. The upper halide-tungstate phase was decanted into a 3″ I.D. graphite crucible; the silicate phase into a cast iron pot. The halide-tungstate phase contained over 99% of the $WO_3$, the analyses of the two phases are shown in the following table:

|  | Percent | | | |
| --- | --- | --- | --- | --- |
|  | $WO_3$ | FeO | MnO | $SiO_2$ |
| Halide-tungstate | 28.0 | 0.25 | 0.30 | 0.10 |
| Silicate | 0.4 | 9.90 | 26.50 | 39.40 |

The halide-tungstate phase, weighing 723 grams, contained 0.88 mole of $Na_2WO_4 \cdot NaCl$ and 7 moles of NaCl. The following salts were added to this phase: 61 grams $B_2O_3$ (0.87 mole), 72 grams NaOH (1.8 moles), and 208 grams NaF (5.0 moles), and electrolysis was carried out in the following manner:

Applied current—100 amperes
Cell potential—3.0–3.5 volts
Initial cathode current density—150 a./dm.$^2$
Duration—1 hr. (100 ampere hours)
Anode—graphite The following results were obtained:

Table 2

Grams of WC per amperes-hours _____ 0.44
WC analysis:
    W _____weight percent__ 92.3
    C _____do____ 6.7
    Al _____p.p.m__ 5
    B _____p.p.m__ 15
    Ca _____p.p.m__ 15
    Cu _____p.p.m__ 50
    Fe _____p.p.m__ 1500
    Mn _____p.p.m__ 1000
    Ni _____p.p.m__ <10
    Si _____p.p.m__ 35

As can be seen from Examples 1 and 2, high quality tungsten monocarbide is produced. Example 2 particularly illustrates that a two-step sequence for recovery of WC from wolframite or scheelite mineral concentrates can be provided by our invention.

The following example illustrates the effect of varying the proportions of ingredients of the molten electrolyte.

EXAMPLE 3

Twenty-one mixtures selected from the system

$Na_2WO_4$-NaCl-$Na_2B_2O_4$-NaOH system were investigated to determine the optimum electrolyte composition for deposition of WC. The NaCl concentration was held constant at 83 mole-percent, and the concentration of each of the other three components was varied from 13.5 to 2.0 mole-percent. When the concentration of one of the three components ($Na_2WO_4$, $Na_2B_2O_4$, or NaOH) was varied, the remainder of the electrolyte composition was divided equally between the other two components. The experimental results were as follows:

TABLE 3.—EFFECT OF ELECTROLYTE COMPOSITION ON ELECTRODEPOSITION

| Test | Electrolyte composition, mole pct.[1] | | | Yield, g./amp. hr. | Product analysis | | |
| --- | --- | --- | --- | --- | --- | --- | --- |
| | $Na_2WO_4$ | $Na_2B_2O_4$ | NaOH | | Total C, pct. | X-ray diffraction [2] | |
| | | | | | | Minor | Trace |
| 1 | 13.5 | 1.8 | 1.8 | 0.27 | 5.3 | $W_2C$ | |
| 2 | 10.0 | 3.5 | 3.5 | .40 | 5.5 | | $W_2C$ |
| 3 | 8.5 | 4.3 | 4.3 | .36 | 5.4 | | $W_2C$, C |
| 4 | 7.0 | 5.0 | 5.0 | .41 | 5.5 | | $W_2C$, C |
| 5 | 5.7 | 5.7 | 5.7 | .45 | 5.9 | | |
| 6 | 5.0 | 6.0 | 6.0 | .48 | 6.0 | | |
| 7 | 4.0 | 6.5 | 6.5 | .43 | 5.7 | | |
| 8 | 3.0 | 7.0 | 7.0 | .44 | 5.9 | | $W_2C$ |
| 9 | 2.0 | 7.5 | 7.5 | .40 | 5.6 | | $W_2C$ |
| 10 | 1.8 | 1.8 | 13.5 | .02 | (3) | (3) | (3) |
| 11 | 3.5 | 3.5 | 10.0 | .24 | 7.6 | | $W_2C$, C |
| 12 | 4.3 | 4.3 | 8.5 | .31 | 6.4 | | $W_2C$ |
| 13 | 5.0 | 5.0 | 7.0 | .41 | 6.0 | | $W_2C$ |
| 5 | 5.7 | 5.7 | 5.7 | .45 | 5.9 | | |
| 14 | 7.0 | 7.0 | 3.0 | .50 | 5.5 | | $W_2C$ |
| 15 | 7.5 | 7.5 | 2.0 | .45 | 5.8 | | $W_2C$ |
| 16 | 1.8 | 13.5 | 1.8 | .33 | 5.3 | $W_2C$ | W |
| 17 | 3.5 | 10.0 | 3.50 | .52 | 6.2 | | $W_2C$ |
| 18 | 4.3 | 8.5 | 4.3 | .49 | 5.6 | | $W_2C$ |
| 19 | 5.0 | 7.0 | 5.0 | .45 | 5.6 | | |
| 5 | 5.7 | 5.7 | 5.7 | .45 | 5.9 | | |
| 20 | 7.0 | 3.0 | 7.0 | .32 | 6.8 | | $W_2C$, C |
| 21 | 7.5 | 2.0 | 7.5 | .12 | 6.4 | | $W_2C$, C |

[1] Also 83 mole-percent NaCl in all electrolytes.
[2] WC was the major constituent in all deposits.
[3] Insufficient sample for analysis.

TABLE 4.—CRYSTAL SIZE DISTRIBUTION AND METALLIC IMPURITIES OF PRODUCT

| Test | Crystal size distribution, pct. | | | | | Spectrographic analysis, p.p.m. | | | | | |
|---|---|---|---|---|---|---|---|---|---|---|---|
| | +60 mesh | −60+100 mesh | −100+200 mesh | −200+325 mesh | −325 mesh | Al | B | Ca | Fe | Mo | Si |
| 1 | 14.0 | 32.0 | 35.0 | 16.0 | 3.0 | <5 | 15 | 50 | 100 | 300 | 10 |
| 4 | 53.0 | 23.0 | 17.5 | 5.0 | 1.5 | 30 | 15 | <15 | 50 | 300 | 30 |
| 5 | 68.5 | 17.0 | 10.5 | 3.0 | 1.0 | 30 | 15 | 15 | 20 | 400 | 10 |
| 6 | 52.0 | 18.0 | 21.0 | 7.0 | 2.0 | 60 | 30 | <15 | 80 | 400 | 50 |
| 9 | 31.5 | 14.0 | 39.0 | 11.0 | 4.5 | 400 | 50 | 15 | 80 | 300 | 250 |
| 11 | 33.0 | 31.0 | 24.0 | 7.5 | 4.5 | 150 | 15 | 30 | 400 | 700 | 20 |
| 13 | 63.5 | 17.5 | 13.5 | 4.0 | 1.5 | 60 | 15 | <15 | 50 | 400 | 50 |
| 15 | 42.5 | 14.0 | 27.0 | 12.0 | 4.5 | 30 | 300 | 15 | 40 | 300 | 20 |
| 16 | 5.0 | 23.5 | 37.5 | 22.0 | 12.0 | 30 | 300 | 15 | 40 | 300 | 20 |
| 19 | 58.0 | 18.0 | 16.0 | 5.5 | 2.5 | 30 | 15 | <15 | 40 | 400 | 50 |
| 21 | 15.0 | 25.5 | 33.0 | 17.5 | 9.0 | 60 | 30 | 30 | 150 | 300 | 20 |

As can be seen from the data in Tables 3 and 4, optimum results (taking into account product purity) were obtained in Test 5 with the electrolyte composition of 83 moles-percent NaCl and 5.7 mole-percent each of $Na_2WO_4$, $Na_2B_2O_4$, and NaOH. Varying the electrolyte composition from this optimum showed the following effects:

(1) Increasing the $Na_2WO_4$ concentration enhanced the co-deposition of $W_2C$ and lowered the yield of the product.

(2) Increasing the $Na_2B_2O_4$ concentration enhanced the co-deposition of both $W_2C$ and tungsten metal.

(3) Increasing the NaOH concentration enhanced the co-deposition of $W_2C$, increased the contamination of the product with free carbon, and decreased the yield of the product. The decrease in yield resulted from dissolution of WC in the highly alkaline electrolyte.

The process of the present invention provides a reliable means for producing a tungsten monocarbide from technical grade compounds which product has a purity comparable to that produced by carburization of high purity metal in the current industrial techniques. Further, it is less costly and complicated. Since production costs would be lowered, the market for tungsten carbide might be broadened thereby.

What is claimed is:

1. A process for electrolytically synthesizing crystalline tungsten monocarbide in an electrolytic cell comprising (a) employing as molten salt bath for said electrolytic synthesis a mixture of alkali metal tungstate, alkali hydroxide, alkali metal halide, and a boron compound selected from the group consisting of $B_2O_3$, $Na_2B_2O_4$, $Na_2B_4O_7$, wherein said alkali metals are sodium, potassium or lithium; and (b) employing a carbon anode in said cell as the source of carbon for said monocarbide.

2. The process of claim 1 wherein the temperature of said bath during said electrolysis is about 850° C. to about 1050° C.

3. The process of claim 2 wherein the temperature of said bath during said electrolysis is about 1000° C. to about 1050° C.

4. The process of claim 1 wherein the mol ratio of bath constituents is 1 mole of alkali metal tungstate per about 14 to about 22 moles of alkali metal halide per about 1.0 to about 2.0 moles of alkali hydroxide per about 0.8 to about 1.2 moles of a boron compound on a $B_2O_3$ basis.

5. The process of claim 1 wherein the mol ratio of boron compound to alkali metal tungstate is about 1:1.

6. The process of claim 1 wherein the initial cathode current density is about 10 to about 150 amp./dm.$^2$, and wherein the anode current density is about 3 to about 50 amp./dm.$^2$.

7. The process of claim 4 wherein the mol ratio of bath constituents is 1 mole of alkali metal tungstate per about 14 to about 22 moles of alkali metal halide per about 1.0 to about 2.0 moles of alkali hydroxide per about 0.8 to about 1.2 moles of boron compound on a $B_2O_3$ basis.

8. The process of claim 4 wherein the temperature of said bath during said electrolysis is about 850° C. to about 1050° C.

9. The process of claim 8 wherein the temperature of said bath during said electrolysis is about 1000° C. to about 1050° C.

10. The process of claim 9 wherein said boron compound is $B_2O_3$.

References Cited

UNITED STATES PATENTS 1,795,512  3/1931  Schmidt et al. _____ 204—61

FOREIGN PATENTS 387,710  6/1963  Japan _____ 204—61

JOHN H. MACK, Primary Examiner

D. R. VALENTINE, Assistant Examiner